(12) United States Patent
Jang et al.

(10) Patent No.: US 9,279,053 B2
(45) Date of Patent: Mar. 8, 2016

(54) POLYCARBONATE RESIN COMPOSITION

(71) Applicants: HYUNDAI MOTOR COMPANY, Seoul (KR); Kia Motors Corporation, Seoul (KR); Samsung SDI Company, Ltd., Yongin-si, Gyeonggi-do (KR)

(72) Inventors: Kyeong Hoon Jang, Seoul (KR); Dae Sik Kim, Yongin-si (KR); Jeong Min Lee, Uiwang-si (KR); Kee Hae Kwon, Uiwang-si (KR); Do Kyoon Kim, Uiwang-si (KR)

(73) Assignees: HYUNDAI MOTOR COMPANY, Seoul (KR); KIA MOTORS CORPORATION, Seoul (KR); SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/569,568

(22) Filed: Dec. 12, 2014

(65) Prior Publication Data

US 2015/0259528 A1 Sep. 17, 2015

(30) Foreign Application Priority Data

Mar. 14, 2014 (KR) ........................ 10-2014-0030436

(51) Int. Cl.
*C08G 75/00* (2006.01)
*C08L 69/00* (2006.01)
*C08G 63/00* (2006.01)

(52) U.S. Cl.
CPC ...................................... *C08L 69/00* (2013.01)

(58) Field of Classification Search
CPC ........................................................ C08L 69/00
USPC .................................. 525/464, 474; 528/171
See application file for complete search history.

(56) References Cited

U.S. PATENT DOCUMENTS

2005/0085580 A1 4/2005 Marugan et al.
2007/0208128 A1 9/2007 Jung et al.
2011/0212318 A1* 9/2011 Loebel et al. .............. 428/304.4

FOREIGN PATENT DOCUMENTS

| JP | 4170706 B2 | 10/2008 |
|---|---|---|
| KR | 10-0869967 A | 11/2008 |
| KR | 10-2010-0050780 A | 5/2010 |
| KR | 10-2013-0087070 A | 8/2013 |
| KR | 10-2015-0076534 A | 7/2015 |

* cited by examiner

*Primary Examiner* — Terressa Boykin
(74) *Attorney, Agent, or Firm* — McDermott Will & Emery LLP

(57) ABSTRACT

The present disclosure relates to a polycarbonate resin composition, which comprises: based on thermoplastic resin 100 parts by weight comprising (A) polycarbonate resin 60 to 80 wt %; and (B) polycarbonate-polysiloxane copolymer resin 20 to 40 wt %, (C) pearl metal particle 1 to 4 parts by weight; and (D) colorant 0.1 to 10 parts by weight.

5 Claims, 1 Drawing Sheet

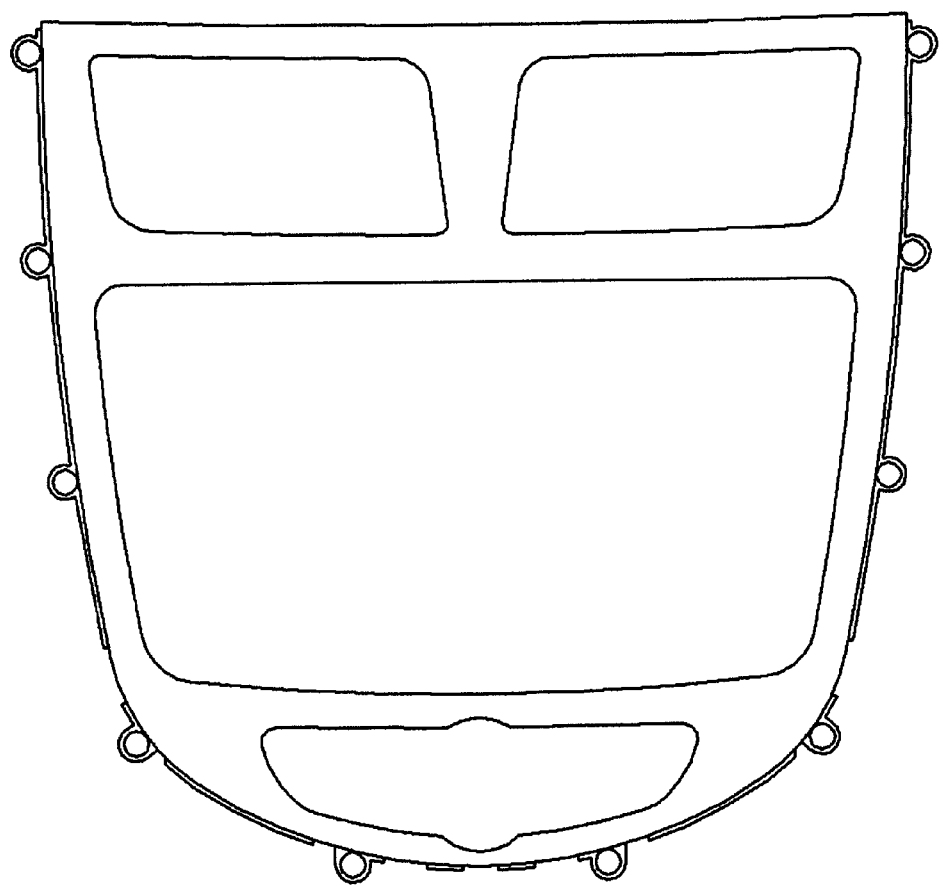

POLYCARBONATE RESIN COMPOSITION

CROSS-REFERENCE TO RELATED APPLICATION

This application claims under 35 U.S.C. §119(a) the benefit of Korean Patent Application No. 10-2014-0030436 filed on Mar. 14, 2014, the entire contents of which are incorporated herein by reference.

BACKGROUND (a) Technical Field

The present disclosure relates to a polycarbonate resin composition, and more particularly to a non-coating polycarbonate resin composition, which satisfies excellent white pearl-coated feeling exterior and physical properties, required for vehicle interior materials, such as impact resistance, light resistance and chemical resistance without separate coating process when manufacturing a product with the composition, by mixing pearl metal particles and a whitish colorant to thermoplastic resin comprising polycarbonate resin and polycarbonate-polysiloxane copolymer resin.

(b) Background

Polycarbonate resin is widely applied for electric and electronic materials and vehicles due to its excellent impact resistance, thermal resistance, hardness and the like. In particular, in the case of vehicle interior materials such as center fascia, indicator panel and the like, the polycarbonate resin or polycarbonate-based alloy resin having excellent physical properties such as impact resistance, thermal resistance, hardness, coloring proprerty and the like are widely used.

Although the polycarbonate resin has excellent properties, it has a problem of deterioration of characteristics such as low temperature impact resistance, chemical resistance and the like.

On the other hand, among the polycarbonate-based alloy resin, polycarbonate/acrylonitrile-butadiene-styrene copolymer alloy (PC/ABS) resin is most widely applied as electric and electronic materials and vehicle interior/exterior materials.

The PC/ABS resin has an advantage of excellent low temperature and room temperature impact resistance as well as excellent thermal resistance, hardness, moldability and the like, but it has a limit on coloring property, and has a defect of deterioration of light resistance against ultraviolet ray (UV). To this end, for luxurious exterior, various color and protection from external attack factors such as UV, chemicals, moisture, heat and the like, painting and coating and the like have been applied to the surface generally. Such a coating process may have some drawbacks. For example, it may include high error rate and high generation rate of harmful volatile components. Additionally, there are many limits on recycle, and the cost increases. Therefore, recently, the demands on non-coated interior materials excluding a coating process according to increase of environmental friendly trend are increasing.

On the other hand, Korean Patent Laid-Open Publication No. 2010-0050780 relates to a polycarbonate resin composition and a method manufacturing thereof. However, when using the polycarbonate resin as a vehicle interior material, there are problems that it may be difficult to embody coated-feeling exterior. Therefore, protection from external environment such as UV and the like, processes such as painting, coating and the like are required.

Accordingly, a polycarbonate resin composition, which has excellent white pearl-coated feeling exterior as well as excellent physical properties such as impact resistance, light resistance and chemical resistance without a separate coating process, thereby more suitable for a vehicle interior material, is needed.

The above information disclosed in this Background section is only for enhancement of understanding of the background of the disclosure and therefore it may contain information that do not constitute the prior art to the instant application.

SUMMARY

In one aspect, the present disclosure provides a polycarbonate resin composition, which comprises: based on thermoplastic resin 100 parts by weight comprising (A) polycarbonate resin 60 to 80 wt %; and (B) polycarbonate-polysiloxane copolymer resin 20 to 40 wt %, (C) pearl metal particle 1 to 4 parts by weight; and (D) colorant 0.1 to 10 parts by weight.

In a preferred embodiment, the pearl metal particle (C) may be sheet-type mica whose surface is coated with metal oxide.

In another preferred embodiment, the metal oxide may be at least one selected from the group consisting of titanium oxide, iron oxide, chromium oxide, silicon dioxide, aluminum oxide, tin oxide, zinc oxide, magnesium oxide, zirconium oxide, cerium oxide, lithium oxide, silver oxide and bismuth oxychloride.

In still another preferred embodiment, the pearl metal particle (C) may have average particle size of 5 to 35 μm, and weight ratio of the metal oxide to the pearl metal particle of 1:0.35 to 0.45.

In yet another preferred embodiment, the colorant (D) may be titanium dioxide ($TiO_2$).

In still yet another preferred embodiment, the polycarbonate resin composition may further comprise at least one additives selected from the group consisting of a dye, a pigment, a filler, a stabilizer, a light resistant agent, a lubricant, an anti-bacterial agent and a release agent.

In another aspect, the present disclosure provides a vehicle interior material manufactured using the polycarbonate resin composition, which has excellent white pearl-coated feeling without separate coating process.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 1 is a center fascia molded article, which is manufactured using the polycarbonate resin composition according to the present disclosure (Example 1), and has white pearl-coated exterior.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

DETAILED DESCRIPTION

The present disclosure describes a composition in which pearl metal particles and a whitish colorant (titanium dioxide) are mixed to thermoplastic resin comprising polycarbonate resin and polycarbonate-polysiloxane copolymer resin. This composition may have excellent physical properties such as impact resistance, light resistance and chemical resistance as well as excellent white pearl-coated feeling by the polycarbonate resin composition itself without separate coating process. Thus, the object of the present disclosure is to provide a polycarbonate resin composition, which has excellent physical properties as well as excellent white pearl-coated feeling without coating. The present disclosure has been made in an effort to solve the above-described problems associated with prior art.

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure provides a polycarbonate resin composition, which comprises: based on thermoplastic resin 100 parts by weight comprising (A) polycarbonate resin 60 to 80 wt %; and (B) polycarbonate-polysiloxane copolymer resin 20 to 40 wt %, (C) pearl metal particle 1 to 4 parts by weight; and (D) colorant 0.1 to 10 parts by weight.

The thermoplastic resin may be a thermoplastic resin comprising (A) polycarbonate resin 60 to 80 wt %, and (B) polycarbonate-polysiloxane copolymer resin 20 to 40 wt %, preferably.

If the polycarbonate resin (A) is contained in an amount of less than 60 wt % or the polycarbonate-polysiloxane copolymer resin (B) is contained in an amount of over 40 wt %, coloring property and physical properties such as thermal resistance may be deteriorated. If the polycarbonate resin (A) is contained in an amount of over 80 wt % or the polycarbonate-polysiloxane copolymer resin (B) is contained in an amount of less than 20 wt %, impact resistance may be deteriorated. Thus, it is preferred to be used within the said range.

The pearl metal particle (C) may be sheet-type mica whose surface is coated with metal oxide, and have average particle size of 5 to 35 μm, and weight ratio of the metal oxide to the pearl metal particle of 1:0.35 to 0.45.

The metal oxide may be at least one selected from the group consisting of titanium oxide, iron oxide, chromium oxide, silicon dioxide, aluminum oxide, tin oxide, zinc oxide, magnesium oxide, zirconium oxide, cerium oxide, lithium oxide, silver oxide and bismuth oxychloride.

At this time, if the average particle size of the pearl metal particle is less than 5 μm or over 35 μm, there may be a limit to embody white pearl-coated feeling exterior. Thus, it is preferred to use pearl metal particle having average particle size within the said range.

Further, the pearl metal particle (C) may be used in an amount of 1 to 4 parts by weight, based on the thermoplastic resin 100 parts by weight, preferably. If the amount of the pearl metal particle is over 4 parts by weight, physical properties such as impact resistance and fluidity may be deteriorated, and if it is less than 1 part by weight, it may be difficult to embody pearl-coated feeling exterior.

Further, the colorant (D), which is used for giving white color in the present disclosure, may be titanium dioxide ($TiO_2$), preferably. The titanium dioxide is characterized in that it is stable on UV, and has a little influence on physical properties such as impact resistance and fluidity when applied to the thermoplastic resin. Accordingly, this may be used in the present disclosure, preferably.

At this time, the colorant may be used in an amount of 0.1 to 10 parts by weight, based on the thermoplastic resin 100 parts by weight, preferably. If the amount of the colorant is less than 0.1 part by weight, it is difficult to embody the desired color, and if it is over 10 parts by weight, physical properties such as impact resistance and fluidity may be deteriorated. Thus, it is preferred to be used within the said range.

Accordingly, when manufacturing a product with the polycarbonate resin composition according to the present disclosure, which has white pearl-coated feeling, coated feeling and feeling of color that customers might prefer can be embodied without separate coating to the product, and exert excellent physical properties such as impact resistance, light resistance and chemical resistance. Thus, it may be broadly used as a vehicle interior material of a center fascia, an indicator panel, an interior garnish, a console upper cover and the like.

EXAMPLES

The following examples illustrate the disclosure and are not intended to limit the same.

Example 1 and Comparative Examples 1 to 7

Polycarbonate resin compositions were prepared according to the ingredients and content shown in the following Table 1.

TABLE 1

| | Ingredient and Content of Polycarbonate Resin Composition | | | | | | | | |
|---|---|---|---|---|---|---|---|---|---|
| | Ingredient | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 |
| Thermo plastic Resin (Unit: | Polycarbonate[2)] | 75 | 100 | 90 | 50 | 75 | 75 | 75 | 75 |
| | Polycarbonate- Polysiloxane Copolymer[3)] | 25 | — | 10 | 50 | 25 | 25 | — | 25 |

TABLE 1-continued

Ingredient and Content of Polycarbonate Resin Composition

| | Ingredient | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Wt %) | Graft Copolymer[4] | — | — | — | — | — | — | 10 | — |
| | Vinyl Copolymer[5] | — | — | — | — | — | — | 15 | — |
| | Total | 100 | 100 | 100 | 100 | 100 | 100 | 100 | 100 |
| Additives[1] (Unit: part by weight) | Pearl Metal Particle 1[6] | 2 | 2 | 2 | 2 | 0.5 | 5 | 2 | — |
| | Pearl Metal Particle 2[7] | — | — | — | — | — | — | — | 2 |
| | Colorant Titanium Dioxide | 5 | 5 | 5 | 5 | 5 | 5 | 5 | 5 |

[1]When thermoplastic resin 100 wt % is regarded as 100 parts by weight, the added amount of the additives is expressed in part by weight based on the thermoplastic resin.
[2]INFINO polycarbonate resin of Cheil Industries, which has Melt flow index (MFI, 310° C./1.2 kg condition) of 6.0 g/10 min, was used.
[3]RC-1700 of IDEMITSU was used.
[4]Graft polymer of core-shell structure wherein styrene and acrylonitrile are graft-copolymerized to butadiene rubber polymer core, which contains the butadiene rubber polymer manufactured by general emulsion polymerization method in an amount of 58%, and has average particle diameter of 270 nm, was used.
[5]Copolymer manufactured by copolymerizing a monomer mixture of styrene 76 wt % and acrylonitrile 24 wt % by suspension polymerization method, which has weight average molecular weight of 150,000 g/mol, was used.
[6]Pearl metal particle, which has average particle size of 20 μm, weight ration of the coated metal oxide to the entire pearl metal particle weight of 1:0.4.
[7]Pearl metal particle, which has average particle size of 125 μm, weight ration of the coated metal oxide to the entire pearl metal particle weight of 1:0.4.

Test Example

Physical Property Test

Compositions, wherein as an additive, a stabilizer, a lubricant, a light resistant agent or a release agent was additionally mixed to the resin compositions of Example 1 and Comparative Examples 1 to 7, was extruded and processed, to obtain pellet-type thermoplastic resins. At this time, the extrusion was conducted using a biaxial extruding machine (L/D=29, diameter: 45 mm), and barrel temperature was set to 260° C. The manufactured pellets were dried at 80° C. for 2 hours, and then samples and center fascia molded articles for testing physical properties were manufactured using a 60 oz injection molding machine at cylinder temperature of 280° C. and mold temperature of 60° C. Physical properties were tested using the samples and molded articles for testing physical properties manufactured as described above. But, physical properties except fluidity, thermal resistance and light resistance were tested using a real center fascia molded article.

(1) Measuring Exterior:
in order to test white pearl-coated feeling, the surface of the samples for testing physical properties of Example and Comparative Examples was examined with the naked eye, and the case having excellent white pearl-coated feeling was marked as OK, and the case having poor white pearl-coated feeling was marked as NG.

(2) Measuring Melt Flow Index (MI):
In order to examine fluidity, melt flow index (MI) was measured according to ASTM standard testing method D1238 at the condition of 250° C. and 10 kg (Unit: g/10 min).

(3) Measuring Heat Deflection Temperature (HDT):
In order to examine thermal resistance, heat deflection temperature (HDT) was measured according to ASTM standard testing method D648 at 18.56 kgf load (Unit: ° C.).

(4) Testing Head Impact:
In order to examine impact resistance, car head impact was tested using an interior part containing center fascia molded article according to a method prescribed by Hyundai motor company MS210-05-B-1 or MS652-14. The case in which center fascia molded body is not broken was marked as Pass, and the case in which the molded article is broken was marked as NG.

(5) Testing Chemical Resistance:
In order to examine chemical resistance, according to a method prescribed by Hyundai Motor Company MS210-05-B-1 or MS652-14, gasoline, engine oil, ethanol, glass cleaner and grease were coated on the surface of an interior part containing a center fascia molded article, stored at a room temperature for 168 hours, and then the exterior was observed with the naked eye. The case with no discoloration, fading, swelling, crack and gloss deterioration on the surface and gray scale is third grade or higher was marked as Pass, but otherwise, marked as NG.

(6) Testing Light Resistance:
According to a method prescribed by Hyundai Motor Company MS210-05-B-1 or MS652-14, light resistance was examined by xenon arc test method prescribed by SAE J 1885. The case in which the color difference (ΔE) after irradiating energy of 126 MJ/m² to a test sample at the condition of 89±3° C., 50±5% RH is 2.0 or less, and gray scale is third grade or higher was marked as Pass, but otherwise, marked as NG.

TABLE 2

Results of Measuring Physical Properties

| | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Exterior | OK | OK | OK | NG | NG | OK | OK | NG |
| MI | 10 | 6 | 7 | 13 | 11 | 8 | 27 | 9 |

TABLE 2-continued

Results of Measuring Physical Properties

| | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| HDT | 125 | 125 | 125 | 123 | 125 | 123 | 110 | 125 |
| Head Impact | Pass | NG | NG | Pass | Pass | NG | Pass | Pass |
| Chemical Resistance | Pass | NG | NG | Pass | Pass | Pass | NG | Pass |
| Light Resistance | Pass | Pass | Pass | Pass | Pass | Pass | NG | Pass |

As shown in Table 2, it can be confirmed that Example manufactured according to the present disclosure exerts excellent white pearl-coated exterior and also all of impact resistance, thermal resistance, chemical resistance and light resistance are excellent, compared to Comparative Examples.

Specifically, like Comparative Example 1, in the case of applying the pearl metal particle and the titanium dioxide to the polycarbonate resin alone, impact resistance and chemical resistance may become poor. Like Comparative Example 2, in the case that the polycarbonate-polysiloxane copolymer resin content is short, impact resistance and chemical resistance may be reduced, and like Comparative Example 3, in the case that the polycarbonate-polysiloxane copolymer resin content is over a certain range, white pearl-coated feeling may be deteriorated.

Like Comparative Example 4, in the case that the pearl metal particle content is short, it may be difficult to exert white pearl-coated feeling exterior, and like Comparative Example 5, in the case that the pearl metal particle content is excessive, impact resistance may be deteriorated.

Further, like Comparative Example 7, in the case of applying pearl metal particle whose particle size is out of the scope of the present disclosure, it also may be difficult to exert excellent white pearl-coated feeling exterior.

Like Comparative Example 6, in the case of applying the pearl metal particle and colorant of the present disclosure to PC/ABS resin, which is commonly used as a vehicle interior material, white pearl-coated feeling exterior or impact resistance may be excellent, but thermal resistance may be poor, and it may be difficult to be directly applied to a vehicle interior material in a non-coated condition without a coating process, due to limits of chemical resistance and light resistance.

Accordingly, the polycarbonate resin composition of the present disclosure has white pearl-coated feeling and feeling of color by itself. Thus, the present disclosure can embody white pearl-coated feeling and feeling of color that customers might prefer, without separate coating to the product, and have excellent physical properties such as impact resistance, light resistance and chemical resistance, when manufacturing a product using thereof.

The polycarbonate resin composition according to the present disclosure can exert white pearl-coated feeling by itself without a separate coating process. Accordingly, by using this, manufacturing processes can be simplified and the cost can be reduced, and furthermore, excellent physical properties such as impact resistance, light resistance and chemical resistance can be obtained. Thus, it can be applied to a vehicle interior material more suitably.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A polycarbonate resin composition, based on thermoplastic resin 100 parts by weight, comprising
   a polycarbonate resin 60 to 80 wt %;
   a polycarbonate-polysiloxane copolymer resin 20 to 40 wt %;
   a pearl metal particle 1 to 4 parts by weight; and
   a colorant 0.1 to 10 parts by weight,
   wherein the pearl metal particle is a mica whose surface is coated with a metal oxide and has an average particle size of 5 to 35 μm, and
   wherein the colorant is titanium dioxide ($TiO_2$).

2. The polycarbonate resin composition of claim 1, wherein the metal oxide is at least one selected from the group consisting of titanium oxide, iron oxide, chromium oxide, silicon dioxide, aluminum oxide, tin oxide, zinc oxide, magnesium oxide, zirconium oxide, cerium oxide, lithium oxide, silver oxide and bismuth oxychloride.

3. The polycarbonate resin composition of claim 1, wherein the pearl metal particle has weight ratio of the metal oxide to the pearl metal particle of 1:0.35 to 0.45.

4. The polycarbonate resin composition of claim 1, which further comprises at least one additives selected from the group consisting of a dye, a pigment, a filler, a stabilizer, a light resistant agent, a lubricant, an anti-bacterial agent and a release agent.

5. A vehicle interior material manufactured using the polycarbonate resin composition of claim 1, which is uncoated but has a white pearl-coated exterior.

\* \* \* \* \*